(12) United States Patent
Motodohi et al.

(10) Patent No.: US 8,784,249 B2
(45) Date of Patent: Jul. 22, 2014

(54) AUTOMATIC TRANSMISSION FOR HYBRID VEHICLE

(71) Applicants: Kazuhiko Motodohi, Anjo (JP); Shinichiro Iga, Okazaki (JP); Yasunari Muranaka, Okazaki (JP)

(72) Inventors: Kazuhiko Motodohi, Anjo (JP); Shinichiro Iga, Okazaki (JP); Yasunari Muranaka, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 20 days.

(21) Appl. No.: 13/756,866

(22) Filed: Feb. 1, 2013

(65) Prior Publication Data

US 2013/0219876 A1    Aug. 29, 2013

(30) Foreign Application Priority Data

Feb. 29, 2012  (JP) ................. 2012-044746

(51) Int. Cl.
*F16H 3/72* (2006.01)
*F16H 57/04* (2010.01)

(52) U.S. Cl.
CPC ................. *F16H 57/0435* (2013.01)
USPC .......................................... 475/5

(58) Field of Classification Search
CPC ............ F16H 57/0446; F16H 57/0442; F16H 57/0435
USPC ........................................... 475/5
See application file for complete search history.

(56) References Cited

U.S. PATENT DOCUMENTS 6,527,074 B1   3/2003  Morishita
7,163,481 B2 *  1/2007  Takagi et al. ................ 475/101
8,403,793 B2 *  3/2013  Moorman et al. ............ 475/137
8,464,851 B2 *  6/2013  Moorman ..................... 192/3.58
2004/0192502 A1 *  9/2004  Suzuki et al. ................ 477/127
2008/0308355 A1   12/2008  Kakinami et al.

FOREIGN PATENT DOCUMENTS

| JP | A-2001-150967 | 6/2001 |
| JP | A-2007-78013 | 3/2007 |
| JP | A-2007-216865 | 8/2007 |
| JP | A-2008-69837 | 3/2008 |
| JP | A-2008-267498 | 11/2008 |
| JP | A-2011-219039 | 11/2011 |

OTHER PUBLICATIONS

International Search Report issued in International Patent Application No. PCT/JP2013/050790 dated Mar. 5, 2013 (w/translation).

* cited by examiner

*Primary Examiner* — Dirk Wright
(74) *Attorney, Agent, or Firm* — Oliff PLC

(57) ABSTRACT

An automatic transmission for a hybrid vehicle comprising a first hydraulic pressure supply source driven with an internal combustion engine; a second hydraulic pressure supply source driven independently of the first supply source; and a regulator valve regulating hydraulic pressure produced by the supply sources. A first oil passage supplying line pressure regulated by the regulator valve to a hydraulic servo operating a friction engagement element; a second oil passage supplying hydraulic pressure discharged from the regulator valve to a lubricated portion via an oil cooler; and a thud oil passage merged with the second oil passage at a point downstream of the oil cooler supplying the hydraulic pressure of the second supply source to the lubricated portion. A first reverse flow prevention mechanism is disposed between the oil cooler and the merging point to prevent reverse flow of hydraulic pressure.

16 Claims, 4 Drawing Sheets

FIG.3

|   | C-1 | C-2 | C-3 | B-1 | B-2 | F-1 |
|---|---|---|---|---|---|---|
| P |  |  |  |  |  |  |
| REV |  |  | ○ |  | ○ |  |
| N |  |  |  |  |  |  |
| 1ST | ○ |  |  |  | ◎ | ○ |
| 2ND | ○ |  |  | ○ |  |  |
| 3RD | ○ |  | ○ |  |  |  |
| 4TH | ○ | ○ |  |  |  |  |
| 5TH |  | ○ | ○ |  |  |  |
| 6TH |  | ○ |  | ○ |  |  |

※ (○): ENGINE BRAKE IN OPERATION

AUTOMATIC TRANSMISSION FOR HYBRID VEHICLE

INCORPORATION BY REFERENCE

The disclosure of Japanese Patent Application No. 2012-044746 filed on Feb. 29, 2012 including the specification, drawings and abstract is incorporated herein by reference in its entirety.

BACKGROUND OF THE INVENTION

The present invention relates to an automatic transmission to be mounted on a hybrid vehicle, for example, and in particular to a hybrid vehicle automatic transmission controlled so that the hybrid vehicle automatic transmission is able to run idle in the case where a vehicle is driven by a rotary electric machine,

DESCRIPTION OF THE RELATED ART

In recent years, a variety of hybrid vehicles have been developed to improve the fuel efficiency of the vehicles, for example. Some of such hybrid vehicles include an automatic transmission that changes the speed of rotation of an internal combustion engine during hybrid travel and engine travel. In the hybrid vehicle including the automatic transmission, at least a part of the automatic transmission (at least a part thereof drivably coupled to wheels) is rotated in an accompanying manner during EV travel in which the vehicle is driven using only a drive force of a motor generator (hereinafter simply referred to as "motor"). Therefore, it is necessary to supply lubricating oil to the automatic transmission even during EV travel.

A large-sized electric oil pump is relatively expensive. Therefore, in general, the hybrid vehicles are provided with a mechanical oil pump that operates in conjunction with the internal combustion engine, and an electric oil pump that assitively produces a hydraulic pressure while the internal combustion engine is stopped, Although it is common with the hybrid vehicles provided with the electric oil pump that a discharge pressure that was unused by a regulator valve that regulates a line pressure is supplied to a lubrication circuit to supply lubricating oil to the lubrication circuit during EV travel, there is proposed a technology in which an oil passage that leads directly from an electric oil pump to a lubrication circuit is provided so that a hydraulic pressure is supplied directly from the electric oil pump to the lubrication circuit when a relief valve (28) is open (see Japanese Patent Application Publication No. 2001-150967 (JP 2001-150967 A)).

SUMMARY OF THE INVENTION

In general, it is necessary to provide a hydraulic circuit of an automatic transmission with an oil cooler that cools oil. In predominant oil coolers, for example, a large number of thin pipes are provided to cause oil to pass through the pipes. A large amount of oil enters the oil cooler, and the hydraulic pressure is significantly fluctuated because of a pipe resistance, etc. over a long passage. Therefore, providing the oil cooler at a location from which a hydraulic pressure is supplied to a hydraulic servo for a friction engagement element (such as a clutch or a brake) would result in unfavorable control of the hydraulic servo. Thus, the oil cooler may not be provided at such a location. Thus, the oil cooler is inevitably provided between the regulator valve and the lubrication circuit.

JP 2001-150967 A mentioned above does not describe the position of arrangement of the oil cooler at all. When the arrangement of the oil cooler is actually designed, however, it is necessary that the oil cooler should be disposed in an oil passage (lubrication piping 22C) between the regulator valve (22) and a lubricating oil passage (LUB) as discussed above.

However, when the oil cooler is disposed in the oil passage between the regulator valve and the lubricating oil passage to supply a lubricating pressure directly from the electric oil pump to the lubricating oil passage, a large amount of oil flows into the oil cooler. Thus, it is difficult to secure a stable hydraulic pressure (that does not fall below a predetermined value) to be supplied to the hydraulic servo for the friction engagement element (hydraulic pressure to be supplied to the regulator valve) during EV travel. In order to secure a stable hydraulic pressure to be supplied to the hydraulic servo, it is necessary to increase the size of the electric oil pump to produce a sufficient hydraulic pressure, which hinders a reduction in cost of the hybrid vehicle automatic transmission.

It is therefore an object of the present invention to provide a hybrid vehicle automatic transmission that enables a reduction in size of an electric oil pump and hence a cost reduction while a stable hydraulic pressure supplied by the electric oil pump during EV travel is secured.

According to an aspect of the present invention (see FIGS. 1 to 4, for example), a hybrid vehicle automatic transmission is disposed on a transfer path between an internal combustion engine and wheels and controlled so as to be able to run idle in the case where a vehicle is driven by a rotary electric machine with the internal combustion engine stopped. The hybrid vehicle automatic transmission includes: a first hydraulic pressure supply source driven in conjunction with the internal combustion engine to produce a hydraulic pressure; a second hydraulic pressure supply source driven by electric power independently of the first hydraulic pressure supply source to produce a hydraulic pressure; a regulator valve that regulates the hydraulic pressure produced by the first hydraulic pressure supply source and the second hydraulic pressure supply source to a line pressure; a first oil passage through which the line pressure regulated by the regulator valve is supplied to a hydraulic servo for engagement and disengagement of a friction engagement element; a second oil passage through which a hydraulic pressure discharged from the regulator valve is supplied to a portion to be lubricated via an oil cooler; a third oil passage through which the hydraulic pressure produced by the second hydraulic pressure supply source is supplied to the portion to be lubricated, the third oil passage being merged with the second oil passage at a location downstream of the oil cooler; and a first reverse flow prevention mechanism disposed between the oil cooler and a merging point that is between the second oil passage and the third oil passage to prevent reverse flow of a hydraulic pressure from the merging point to the oil cooler.

In this configuration, the first reverse flow prevention mechanism is disposed between the oil cooler and the merging point that is between the second oil passage and the third oil passage to prevent reverse flow of a hydraulic pressure from the merging point to the oil cooler. Thus, when the hydraulic pressure produced by the second hydraulic pressure supply source is supplied to the portion to be lubricated via the third oil passage in the case where the vehicle is driven by the rotary electric machine with the internal combustion engine stopped, it is possible to prevent a large amount of oil from flowing into the oil cooler. This makes it possible to secure a stable hydraulic pressure to be supplied to the hydraulic servo. This also eliminates the need to increase the size of the electric oil pump, thereby reducing the cost of the hybrid vehicle automatic transmission.

In the hybrid vehicle automatic transmission according to the aspect (see FIG. 4, for example), the first reverse flow prevention mechanism may be a one-way valve.

With this configuration, the first reverse flow prevention mechanism, which is a one-way valve, can be easily retrofitted between the oil cooler and the merging point between the second oil passage and the third oil passage without significantly changing the design of the automatic transmission, for example.

In the hybrid vehicle automatic transmission according to the aspect (see FIG. 4, for example), the regulator valve may be configured such that the regulator valve includes: a spool; an urging member that urges the spool toward one side of the regulator valve; a pressure regulation port connected to respective discharge ports of the first hydraulic pressure supply source and the second hydraulic pressure supply source and connected to the first oil passage; a feedback oil chamber that is connected to the pressure regulation port and that presses the spool toward the other side of the regulator valve by using an input hydraulic pressure; and a discharge port that establishes communication between the pressure regulation port and the second oil passage when the spool is moved to the other side of the regulator valve, and that an urging force of the urging member exceeds a feedback force produced in the feedback oil chamber even in the case where the second hydraulic pressure supply source produces a maximum hydraulic pressure when an oil temperature is low.

In this configuration, the regulator valve is configured such that the urging force of the urging member exceeds the feedback force produced in the feedback oil chamber even in the case where the second hydraulic pressure supply source produces a maximum hydraulic pressure when the oil temperature is low. Thus, in the case where the hydraulic pressure produced by the second hydraulic pressure supply source is lowered when the oil temperature is low, for example, oil is prevented from flowing from the discharge port of the regulator valve to the oil cooler to secure the amount of oil that flows through the third oil passage. That is, it is possible to prevent occurrence of insufficient lubrication even when the oil temperature is low.

The hybrid vehicle automatic transmission according to the aspect (see FIG. 4, for example) may further include: an orifice mechanism provided on the third oil passage at a location upstream of the merging point to set an amount of oil supplied from the second hydraulic pressure supply source to the hydraulic servo and an amount of oil supplied from the second hydraulic pressure supply source to the portion to be lubricated.

In this configuration, the orifice mechanism is provided on the third oil passage at a location upstream of the merging point to set the amount of oil supplied from the second hydraulic pressure supply source to the hydraulic servo and the amount of oil supplied from the second hydraulic pressure supply source to the portion to be lubricated. This prevents a phenomenon in which the amount of oil for the portion to be lubricated is increased excessively, for example, to result in an insufficient amount of oil to be supplied to the hydraulic servo for the friction engagement element. Consequently, preparations for engagement of the friction engagement element can be made accurately even during EV travel, which enables a responsive transition from EV travel to travel which uses the internal combustion engine or hybrid travel.

The hybrid vehicle automatic transmission according to the aspect (see FIG. 4, for example) may further include: a second reverse flow prevention mechanism interposed between the first hydraulic pressure supply source and the second hydraulic pressure supply source to prevent reverse flow of a hydraulic pressure from the first hydraulic pressure supply source to the second hydraulic pressure supply source; and a third reverse flow prevention mechanism provided on the third oil passage at a location on a second hydraulic pressure supply source side with respect to the merging point to prevent reverse flow of a hydraulic pressure from the first hydraulic pressure supply source to the second hydraulic pressure supply source.

In this configuration, the second reverse flow prevention mechanism is interposed between the first hydraulic pressure supply source and the second hydraulic pressure supply source to prevent reverse flow of a hydraulic pressure from the first hydraulic pressure supply source to the second hydraulic pressure supply source, and the third reverse flow prevention mechanism is provided on the third oil passage on the second hydraulic pressure supply source side with respect to the merging point to prevent reverse flow of a hydraulic pressure from the first hydraulic pressure supply source to the second hydraulic pressure supply source. Thus, it is possible to prevent reverse flow of a hydraulic pressure to the second hydraulic pressure supply source during travel with the first hydraulic pressure supply source producing a hydraulic pressure. In particular, reverse flow of a hydraulic pressure from the oil cooler to the second hydraulic pressure supply source via the third oil passage is not caused, which prevents an insufficient amount of oil for the portion to be lubricated.

BRIEF DESCRIPTION OF THE DRAWINGS

FIG. 3 is an engagement table of the hybrid vehicle automatic transmission; and

DETAILED DESCRIPTION OF THE EMBODIMENTS

An embodiment of the present invention will be described below with reference to FIGS. 1 to 4. First, an example of a hybrid vehicle to which the present invention may be applied will be described with reference to FIG. 1.

Figure 1:
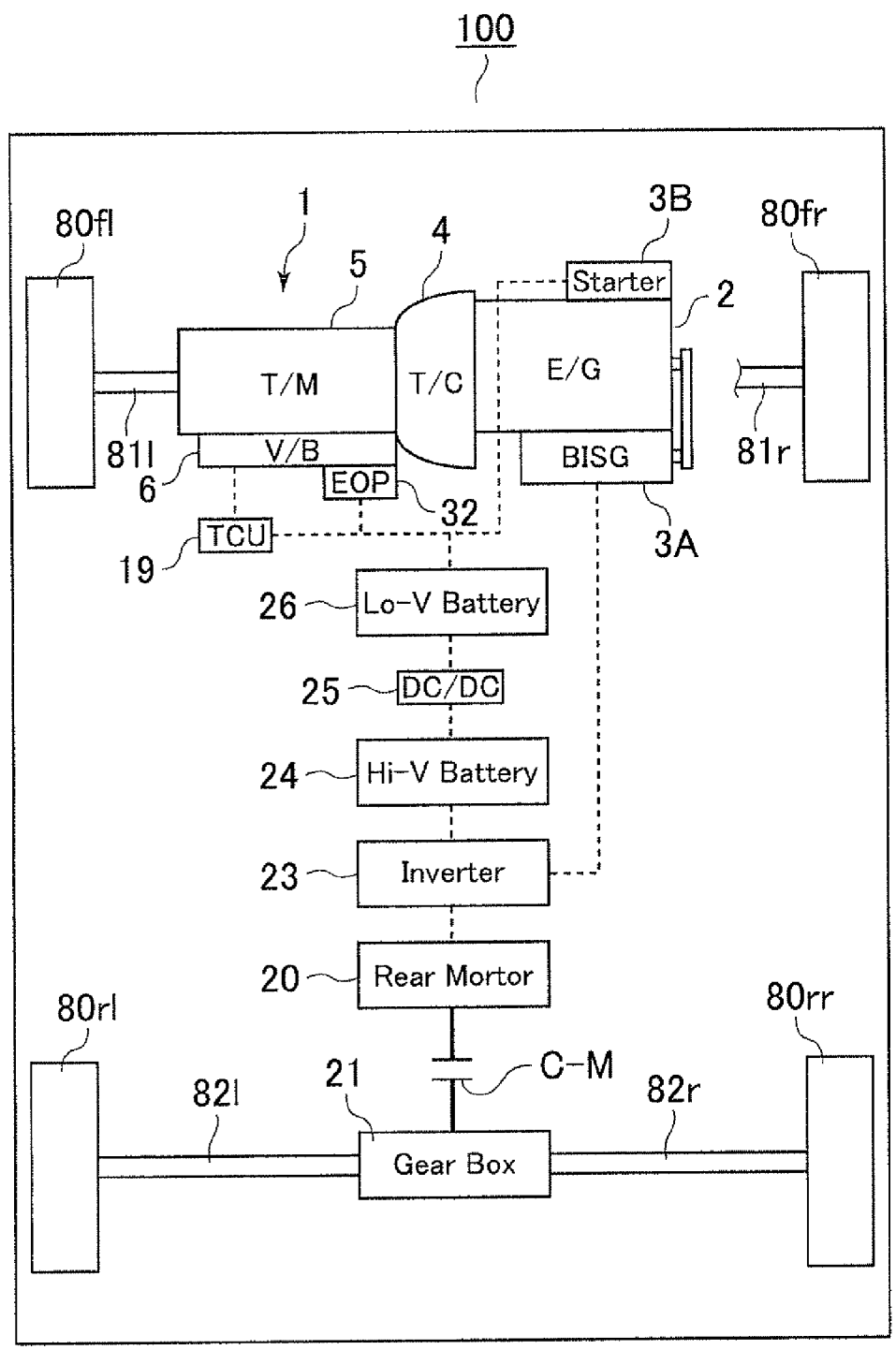
FIG. 1 is a schematic diagram showing a hybrid vehicle to which the present invention may be applied.

As shown in FIG. 1, a hybrid vehicle 100 according to the embodiment is a rear-motor hybrid vehicle, which is formed like a so-called FF (front-engine front-drive) vehicle including an internal combustion engine (E/G) 2 mounted in the front side of the vehicle and a hybrid vehicle automatic transmission (hereinafter simply referred to as "automatic transmission") 1 mounted on a transfer path L (see FIG. 2) between the internal combustion engine 2 and left and right front wheels 80*fl*, 80*fr*, and which also includes a rear motor (rotary electric machine) 20 drivably coupled to left and right rear wheels 80*rl*, 80*rr*. That is, the hybrid vehicle 100 is configured to be able to be driven by the front wheels during engine travel, driven by the rear wheels during EV travel, and driven by the four wheels during hybrid travel.

More particularly, a belt integrated starter generator (BISG) 3A is connected to the internal combustion engine 2 to be able to start the internal combustion engine 2. The belt integrated starter generator (BISG) 3A is supplied with electric power from a high-voltage battery (Hi-V Battery) 24 via an inverter 23 to be able to start the internal combustion engine 2 with high output and charge the high-voltage battery 24 during operation (drive) of the internal combustion engine 2.

A starter 3B is a starter driven by a common low-voltage battery (Lo-V Battery) 26 (a so-called 12-V power source). In the hybrid vehicle 100, the belt integrated starter generator (BISG) 3A is used to raise the rotational speed of the internal combustion engine 2 to a rotational speed higher than an idle rotational speed and thereafter ignite the internal combustion engine 2 at normal temperature (equal to or more than 0 degrees, for example), and the starter 3B is used to normally start the internal combustion engine 2 at low temperature (less than 0 degrees, for example).

The automatic transmission 1 to be discussed in detail later is connected to the internal combustion engine 2. The automatic transmission 1 roughly includes a torque converter (TIC) 4, an automatic speed change mechanism (T/M) 5, a hydraulic control device (V/B) 6, and so forth. The torque converter 4 is drivably coupled to the internal combustion engine 2. The automatic speed change mechanism (T/M) 5 is drivably coupled to the torque converter 4. The automatic speed change mechanism 5 is connected to left and right axles 81*l*, 81*r* via a differential device D (see FIG. 2) as discussed in detail later to be drivably coupled to the left and right front wheels 80*fl*, 80*fr*. A mechanical oil pump (first hydraulic pressure supply source) 31 to be discussed later is drivably coupled to a pump impeller 4*a* (see FIG. 2) of the torque converter 4 to be discussed later.

The automatic speed change mechanism 5 is provided with the hydraulic control device (V/B) 6 which controls hydraulic pressures for friction engagement elements (clutches and brakes) to be discussed later. Solenoid valves, etc. built in the hydraulic control device 6 are electronically controlled on the basis of an electronic command from a control section (Transmission Control Unit: TCU) 19. The hydraulic control device 6 is provided with an electric oil pump (second hydraulic pressure supply source) 32 driven independently of the internal combustion engine 2 as discussed in detail later so that a hydraulic pressure can be supplied from the electric oil pump 32 to the hydraulic control device 6.

The electric oil pump 32 and the control section 19 are driven with electric power of the low-voltage battery 26. The low-voltage battery 26 is connected to the high-voltage battery 24 via a DC/DC converter (step-down circuit) 25 to be supplied with electric power from the high-voltage battery 24.

The rear motor 20 is connected to the high-voltage battery 24 via the inverter 23 to be able to perform power running and regeneration. The rear motor 20 is drivably coupled to a gear box 21 via a motor disengagement clutch C-M. A speed reduction gear mechanism with a predetermined speed reduction ratio and a differential device (not shown) are built in the gear box 21. When the motor disengagement clutch C-M is engaged, rotation of the rear motor 20 is transferred to the left and right rear wheels 80*rl*, 80*rr* with the speed reduction gear mechanism of the gear box 21 reducing the speed of the rotation and the differential device absorbing the difference in rotation between left and right axles 82*l*, 82*r*.

Then, the configuration of the automatic transmission 1 will be described with reference to FIG. 2. The automatic transmission 1 is disposed to form the transfer path L between the internal combustion engine 2 (see FIG. 1) and the left and right front wheels 80*fl*, 80*fr*. The automatic transmission 1 includes an input shaft 8 that can be connected to a crankshaft of the internal combustion engine 2 (see FIG. 1), and the torque converter 4 and the automatic speed change mechanism 5 discussed above centered around the axial direction of the input shaft 8.

The torque converter 4 includes the pump impeller 4*a* connected to the input shaft 8 of the automatic transmission 1, a turbine runner 4*b* to which rotation of the pump impeller 4*a* is transferred via a hydraulic fluid, and a stator 4*c* that increases torque and straightens the flow of oil returning from the turbine runner 4*b* to the pump impeller 4*a*. The turbine runner 4*b* is connected to an input shaft 10 of the automatic speed change mechanism 5 disposed coaxially with the input shaft 8. The torque converter 4 further includes a lock-up clutch 7. When the lock-up clutch 7 is engaged, rotation of the input shaft 8 of the automatic transmission 1 is directly transferred to the input shaft 10 of the automatic speed change mechanism 5.

When rotation of the turbine runner 4*b* falls below rotation of the pump impeller 4*a*, the stator 4*c* is fixed not to be rotated by a one-way clutch F so that the stator 4*c* receives a reaction force of the flow of oil to increase torque. When rotation of the turbine runner 4*b* exceeds rotation of the pump impeller 4*a*, the stator 4*a* runs idle so that the flow of oil is not directed in the negative direction.

Figure 2:
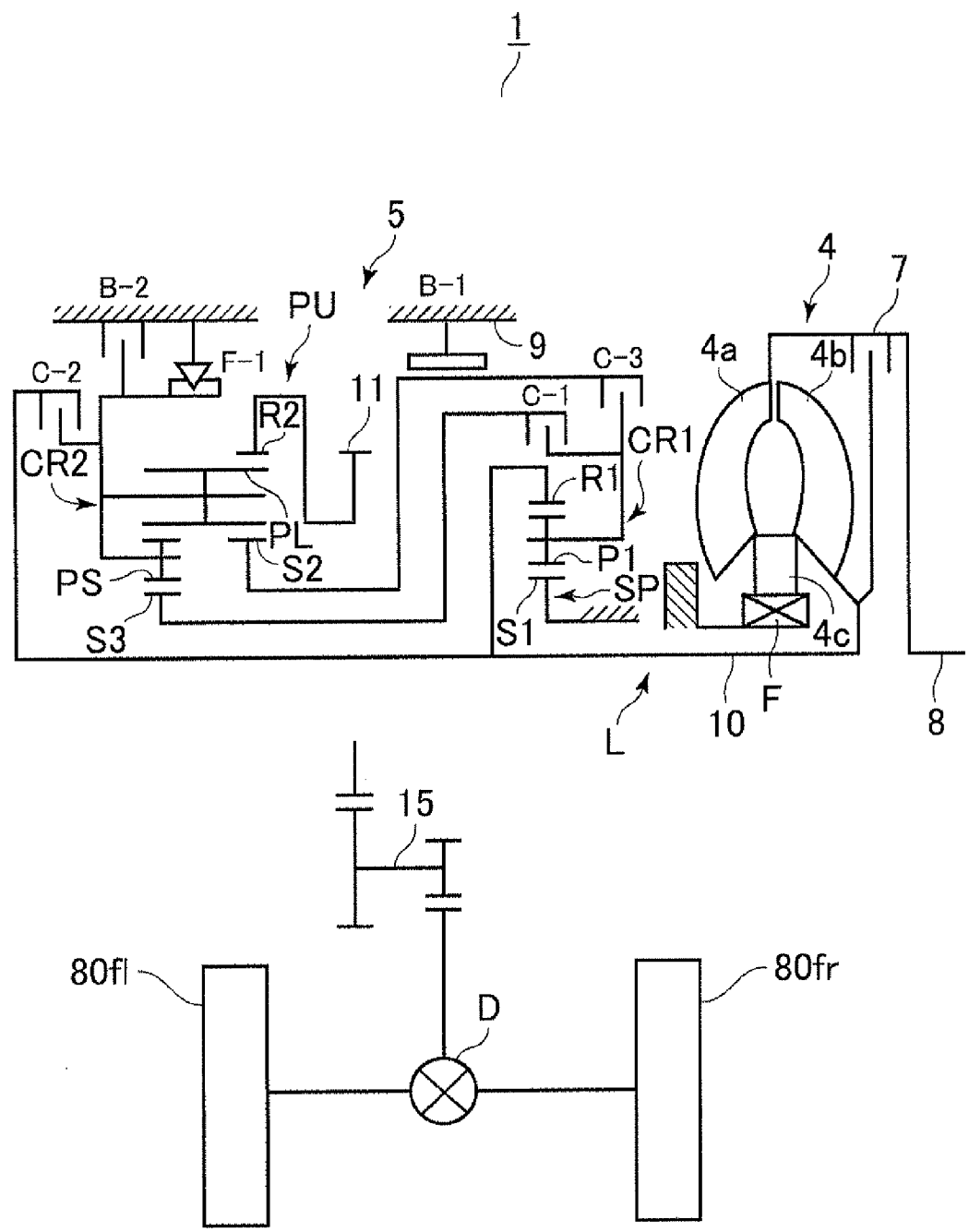
FIG. 2 is a skeleton diagram showing a hybrid vehicle automatic transmission.

An end portion of the pump impeller 4*a* on the automatic speed change mechanism 5 side is drivably coupled to the mechanical oil pump 31 which is not shown in FIG. 2. That is, the mechanical oil pump 31 is drivably coupled to the pump impeller 4*a* of the torque converter 4 to operate in conjunction with the internal combustion engine 2 via the input shaft 8.

The automatic speed change mechanism 5 includes a planetary gear SP and a planetary gear unit PU provided on the input shaft 10. The planetary gear SP is a so-called single-pinion planetary gear, which includes a sun gear S1, a carrier CR1, and a ring gear R1 and in which the carrier CR1 includes a pinion P1 meshed with the sun gear S1 and the ring gear R1.

The planetary gear unit PU is a so-called Ravigneaux type planetary gear, which includes four rotary elements, namely a sun gear S2, a sun gear S3, a carrier CR2, and a ring gear R2 and in which the carrier CR2 includes a long pinion PL meshed with the sun gear S2 and the ring gear R2 and a short pinion PS meshed with the sun gear S3 in such a manner that the long pinion PL and the short pinion PS are meshed with each other.

The sun gear S1 of the planetary gear SP is connected to a boss integrally fixed to a transmission case 9 so as not to be rotatable. The ring gear R1 makes the same rotation (hereinafter referred to as "input rotation") as rotation of the input shaft 10. Further, the carrier CR1 rotates at a speed reduced compared to the speed of the input rotation by the sun gear S1 which is fixed and the carrier CR1 which makes the input rotation. The carrier CR1 is connected to a clutch (friction engagement element) C-1 and a clutch (friction engagement element) C-3.

The sun gear S2 of the planetary gear unit PU is connected to a brake (friction engagement element) B-1 formed as a band brake so as to be selectively fixed with respect to the transmission case 9. The sun gear S2 is also connected to the clutch C-3 so as to selectively receive reduced-speed rotation of the carrier CR1 via the clutch C-3. The sun gear S3 is connected to the clutch C-1 so as to selectively receive reduced-speed rotation of the carrier CR1.

Further, the carrier CR2 is connected to a clutch (friction engagement element) C-2, to which rotation of the input shaft 10 is input, so as to selectively receive the input rotation via the clutch C-2. The carrier CR2 is also connected to a one-way clutch F-1 and a brake (friction engagement element) B-2 so as to be restricted from rotating in one direction with respect to the transmission case 9 via the one-way clutch F-1 and so as to be selectively fixed (unrotatable) via the brake B-2. The ring gear R2 is connected to a counter gear 11. The counter gear 11 is connected to the wheels 80fl, 80fr via a counter shaft 15 and the differential device D.

In the hybrid vehicle 100 configured as described above, during engine travel in which the drive force of the internal combustion engine 2 is used, the motor disengagement clutch C-M shown in FIG. 1 is disengaged to disengage the rear motor 20 from the wheels 80rl, 80rr. Then, in the automatic transmission 1, the control section 19 determines an optimum shift speed in accordance with the vehicle speed and the accelerator operation amount to electronically control the hydraulic control device 6. The speed of a drive force of the internal combustion engine 2 is changed by one of first to sixth forward speeds and a reverse speed established on the basis of the determined shift speed so that the drive force of the internal combustion engine 2 is transferred to the wheels 80fl, 80fr. The first to sixth forward speeds and the reverse speed of the automatic transmission 1 are established with the clutches C-1 to C-3, the brakes B-1 to B-2, and the one-way clutch F-1 operated as defined in the operation table shown in FIG. 3.

When a transition is made from engine travel to hybrid travel, the motor disengagement clutch C-M shown in FIG. 1 is engaged to drivably couple the rear motor 20 to the wheels 80rl, 80rr. This allows the drive force of the rear motor 20 to be appropriately used assistively or for regeneration on the basis of the accelerator operation amount (request for a drive force from a driver) in addition to engine travel. That is, the hybrid vehicle 100 is driven using the drive force of the internal combustion engine 2 and the drive force of the rear motor 20.

During acceleration during engine travel in which the vehicle is driven by the drive force of the internal combustion engine 2, the motor disengagement clutch C-M may be disengaged to disengage the rear motor 20 from the wheels 80rl, 80rr so as not to cause a travel resistance. During deceleration during engine travel, meanwhile, the motor disengagement clutch C-M is preferably engaged so that the rear motor 20 applies regenerative braking, thereby the fuel efficiency is improved.

During EV travel, the motor disengagement clutch C-M shown in FIG. 1 is engaged to drivably couple the rear motor 20 to the wheels 80rl, 80rr. The internal combustion engine 2 is stopped, and the clutches C-2 to C-3 and the brakes B-1 to B-2 in the automatic transmission 1 are disengaged so that the automatic transmission 1 can run idle. This allows the drive force of the rear motor 20 to be appropriately used for power running or regeneration on the basis of the accelerator operation amount (request for a drive force from a driver). That is, the hybrid vehicle 100 is driven using only the drive force of the rear motor 20.

During EV travel, members drivably coupled to the wheels 80fl, 80fr of the automatic speed change mechanism 5 (such as the differential device D, the counter shaft 15, the counter gear 11, and each gear of the planetary gear unit PU) are rotated in an accompanying manner, and the mechanical oil pump 31 is stopped as the internal combustion engine 2 is stopped. Thus, it is necessary that the electric oil pump 32 should supply lubricating oil to portions to be lubricated of the automatic speed change mechanism 5.

During EV travel, preferably, preparations for engagement of the clutch C-1 have been made or engagement of the clutch C-1 has been completed in preparation for a transition from EV travel to hybrid travel. Even if the clutch C-1 is engaged during EV travel, the automatic speed change mechanism 5 is in a towed state which is similar to the state during engine braking, and controlled so as to be able to run idle with the one-way clutch F-1 running idle. Therefore, it is necessary that the electric oil pump 32 should also produce a hydraulic pressure for preparation for or completion of engagement of the clutch C-1. It is a matter of course that the clutch C-1 may be disengaged to bring the automatic speed change mechanism 5 into a completely neutral state.

Figure 4:
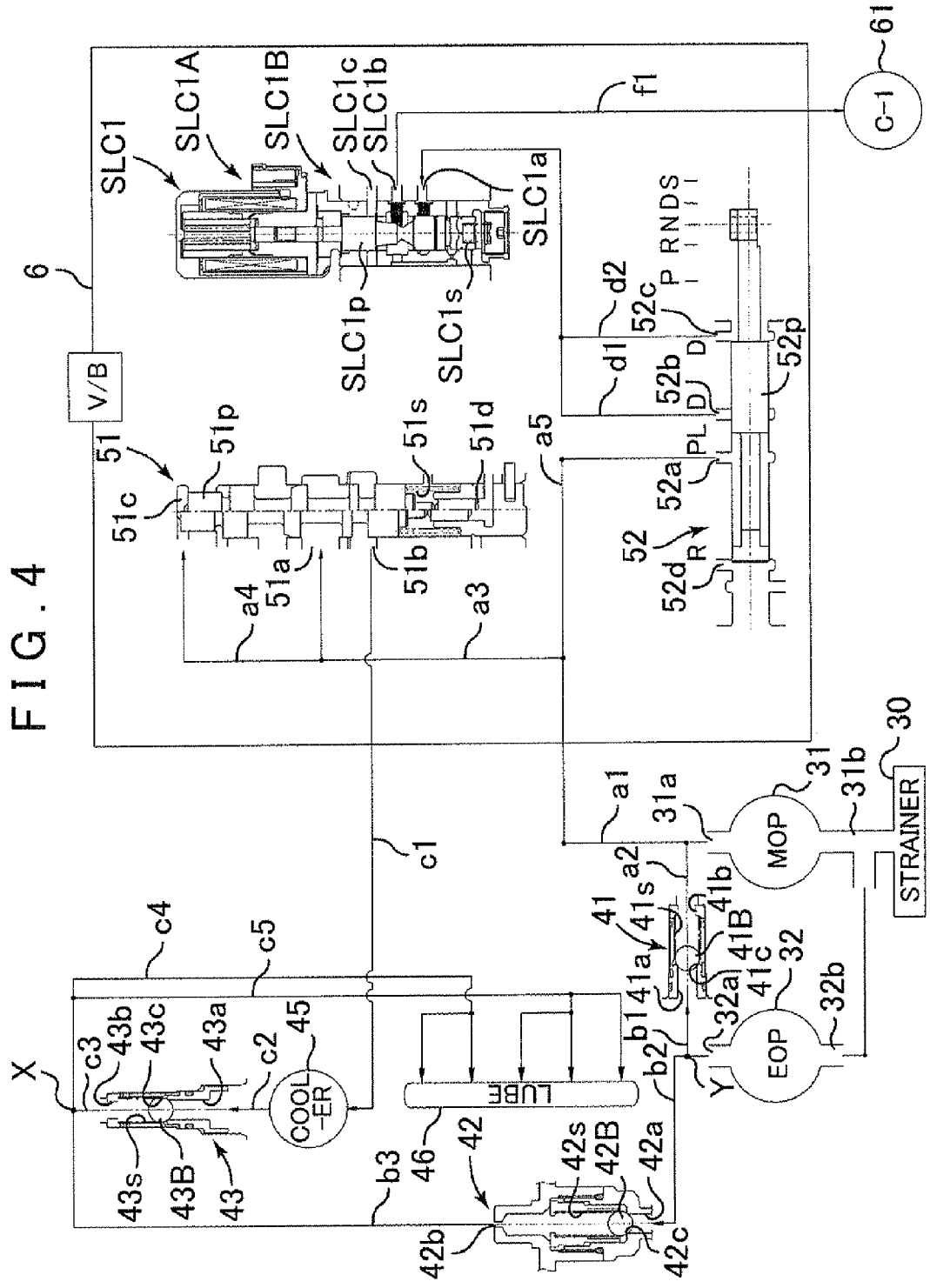
FIG. 4 is a hydraulic circuit diagram showing the oil passage structure of the hybrid vehicle automatic transmission.

Then, the hydraulic circuit of the automatic transmission 1 according to the present invention, which is an essential portion of the present invention, will be described with reference to FIG. 4. As shown in FIG. 4, the automatic transmission 1 includes the mechanical oil pump (MOP) 31 driven in conjunction with rotation of the internal combustion engine 2, and the electric oil pump (EOP) 32 driven by an electric motor (not shown) mainly when the internal combustion engine 2 is stopped. The mechanical oil pump 31 and the electric oil pump 32 can produce a hydraulic pressure by suctioning from their suction port 31b, 32b oil from an oil pan (not shown) via a strainer 30.

A discharge port 32a of the electric oil pump 32 is connected to an oil passage b1 via a branch portion Y. The oil passage b1 is connected to an opening portion 41a of a second check ball valve (second reverse flow prevention mechanism) 41. The second check ball valve 41 includes a ball 41B and a spring 41s that urges the ball 41B in a direction of bringing the ball 41B into contact with a seal surface 41c. When the hydraulic pressure at an opening portion 41b and the urging force of the spring 41s are larger than the hydraulic pressure supplied to the opening portion 41a, the ball 41B tightly contacts the seal surface 41c to block communication between the opening portion 41a and the opening portion 41b. When the hydraulic pressure supplied to the opening portion 41a is larger than the hydraulic pressure at the opening portion 41b and the urging force of the spring 41s, the ball 41B is moved away from the seal surface 41c to establish communication between the opening portion 41a and the opening portion 41b.

The opening portion 41b of the second check ball valve 41 is connected to a discharge port 31a of the mechanical oil pump 31 via an oil passage a2. That is, the second check ball valve 41 is interposed between the mechanical oil pump 31 and the electric oil pump 32 to prevent reverse flow of a hydraulic pressure from the mechanical oil pump 31 to the electric oil pump 32.

The hydraulic pressure produced by the mechanical oil pump 31 or the electric oil pump 32 is supplied to oil passages a3, a4, a5 via an oil passage a1. The hydraulic pressure supplied to the oil passages a3, a4 is supplied to a pressure regulation port 51a and a feedback oil chamber 51c of a regulator valve 51.

The regulator valve 51 includes a spool 51p and a spring (urging member) 51s that urges the spool 51p upward (toward one side of the regulator valve 51), and further includes the feedback oil chamber 51c provided above the spool 51p, a working oil chamber 51d provided below the spool 51p, the pressure regulation port 51a, and a discharge port 51b. A control pressure $P_{SLT}$ matching the throttle opening is input from a linear solenoid valve SLT (not shown), for example, to the working oil chamber 51d.

In the regulator valve 51, when the spool 51p is brought into a state shown on the left half in the drawing on the basis of the control pressure $P_{SLT}$ in the working oil chamber 51d, communication between the pressure regulation port 51a and the discharge port 51b is blocked. That is, the regulator valve 51 does not perform pressure regulation operation, and thus the hydraulic pressure in the oil passages a1 to a5 remains the same as the hydraulic pressure output from the mechanical oil pump 31 or the electric oil pump 32 to be used as a line pressure $P_L$.

As the line pressure $P_L$ supplied to the feedback oil chamber 51c (that is, a pressing force toward the other side of the regulator valve 51) becomes larger than the urging force of the spring 51s and the control pressure $P_{SLT}$ in the working oil chamber 51d, the spool 51p is brought into a state shown on the right half in the drawing. Consequently, communication between the pressure regulation port 51a and the discharge port 51b is established so that a hydraulic pressure is produced in an oil passage c1 as a discharge pressure, and the hydraulic pressure in the oil passages a1 to a5 is regulated to the line pressure $P_L$ which has been reduced compared to the hydraulic pressure output from the mechanical oil pump 31 or the electric oil pump 32. The thus regulated line pressure $P_L$ is supplied to a line pressure input port 52a of a manual shift valve 52.

The regulator valve 51 according to the embodiment is configured such that the urging force of the spring 51s exceeds the feedback force produced in the feedback oil chamber 51c even in the case where the electric oil pump 32 produces a maximum hydraulic pressure when the oil temperature is low during EV travel (with the mechanical oil pump 31 stopped). That is, in the case where the hydraulic pressure produced by the electric oil pump 32 is lowered when the oil temperature is low, oil is prevented from flowing from the discharge port 51b of the regulator valve 51 to an oil cooler 45 to be discussed later. This state of the regulator valve 51 may be referred to as regulating the maximum hydraulic pressure of the electric oil pump 32 as it is to the line pressure $P_L$, and is also included in the line pressure regulating state.

The manual shift valve 52 includes a spool 52p driven mechanically (or electrically) by operating a shift lever (not shown) provided in a driver's seat. Whether the line pressure $P_L$ which has been input is output or not output (drained) is determined by changing the position of the spool 52p in accordance with a shift range (for example, P, R, N, D, S) selected using the shift lever.

More particularly, when the manual shift valve 52 is brought into a forward range (D range, S range) by operating the shift lever, the line pressure input port 52a to which the line pressure $P_L$ is input is communicated with a forward range pressure output port 52b on the basis of the position of the spool 52p so that the line pressure $P_L$ is output from the forward range pressure output port 52b as a forward range pressure (D range pressure) $P_D$.

Meanwhile, when the manual shift valve 52 is brought into a reverse range (R range) by operating the shift lever, the line pressure input port 52a is communicated with a reverse range pressure output port 52d on the basis of the position of the spool 52p so that the line pressure $P_L$ is output from the reverse range pressure output port 52d as a reverse range pressure (R range pressure) $P_{REV}$.

When the manual shift valve 52 is brought into the P range or the N range by operating the shift lever, the spool 52p blocks communication between the line pressure input port 52a and the forward range pressure output port 52b and the reverse range pressure output port 52d, and a forward range pressure discharge port 52c and the reverse range pressure output port 52d are communicated with a drain port so that no output is produced with the D range pressure $P_D$ and the R range pressure $P_R$ drained (discharged).

The forward range pressure output port 52b of the manual shift valve 52 is connected via an oil passage d1 to an input port SLC1a of a linear solenoid valve SLC1 that regulates an engagement pressure for the clutch C-1. Similarly, the forward range pressure output port 52b is also connected to linear solenoid valves that regulate an engagement pressure for the clutch C-2, the brake B-1, the brake B-2, etc., respectively, although not shown. Meanwhile, the reverse range pressure output port 52d is connected to an oil passage that can output a hydraulic pressure to a hydraulic servo for the brake B-2 which establishes the reverse speed, although not shown. A linear solenoid valve that regulates a hydraulic pressure for the clutch C-3 is configured to receive the line pressure $P_L$ directly, rather than via the manual shift valve 52, for example, to be able to engage the clutch C-3 during forward travel and reverse travel, although not shown.

The linear solenoid valve SLC1 includes a solenoid portion SLC1A electronically controlled on the basis of an electronic command from the control section 19, and a valve portion SLC1B in which a spool SLC1p is driven and moved by the solenoid portion SLC1A. The valve portion SLC includes the spool SLC1p, a spring SLC1s that urges the spool SLC upward in the drawing, the input port SLC1a, an output port SLC1b, and a discharge port SLC1c. The valve portion SLC is a so-called normally closed type in which the input port SLC1a is blocked by the spool SLC1p because of the urging force of the spring SLC1s.

In the linear solenoid valve SLC1, when the control section 19 provides a command to engage the clutch C-1, the solenoid portion SLC drives and moves the spool SLC1p downward in the drawing to gradually establish communication between the input port SLC1a and the output port SLC1b. Consequently, the line pressure $P_L$ at the input port SLC1a is supplied, while being regulated, to a hydraulic servo 61 for the clutch C-1 via an oil passage f1 as an engagement pressure to engage the clutch C-1.

When the control section 19 provides a command to disengage the clutch C-1, conversely, the solenoid portion SLC1A drives and moves the spool SLC1p upward in the drawing to gradually block communication between the input port SLC1a and the output port SLC1b and establish communication between the output port SLC1b and the discharge port SLC1c. Consequently, the engagement pressure is discharged from the hydraulic servo 61 for the clutch C-1 via the oil passage f1 to disengage the clutch C-1.

During EV travel, as discussed above, in order to make preparations for engagement of the clutch C-1 or complete engagement of the clutch C-1, the control section 19 controls the linear solenoid valve SLC1 so as to supply an engagement pressure obtained by regulating (reducing) the line pressure $P_L$ to the hydraulic servo 61, or supply the line pressure $P_L$ as it is to the hydraulic servo 61 as the engagement pressure.

Meanwhile, an oil passage b2, which is connected to the discharge port 32a of the electric oil pump 32 via the branch portion Y, is connected to an opening portion 42a of a third check ball valve (third reverse flow prevention mechanism) 42. The third check ball valve 42 includes a ball 42B and a spring 42s that urges the ball 42B in a direction of bringing the ball 42B into contact with a seal surface 42c. When the hydraulic pressure at an opening portion 42b and the urging force of the spring 42s are larger than the hydraulic pressure supplied to the opening portion 42a, the ball 42B tightly contacts the seal surface 42c to block communication between the opening portion 42a and the opening portion 42b. When the hydraulic pressure supplied to the opening portion 42a is larger than the hydraulic pressure at the opening portion 42b and the urging force of the spring 42s, the ball 42B is moved away from the seal surface 42c to establish communication between the opening portion 42a and the opening portion 42b.

The opening portion 42b of the third check ball valve 42 is connected via an oil passage b3 to a merging point X between the oil passage b3 and an oil passage c3 to be discussed later, and further connected via oil passages c4, c5 to a lubrication circuit (LUBE) 46 that opens to the portions to be lubricated of the automatic speed change mechanism 5. That is, the third check ball valve 42 is provided on the oil passages b2, b3 (on a third oil passage) at a location on the electric oil pump 32 side with respect to the merging point X to prevent reverse flow of a hydraulic pressure from the discharge port 51b of the regulator valve 51 (that is, from the mechanical oil pump 31) to the electric oil pump 32. The merging point X is located downstream of the oil cooler 45 (between the oil passage c3 and the oil passage c4) in the oil passages c1 to c5 (second oil passage). That is, the oil passage c3 is merged with the oil passage b3 (third oil passage) at a location downstream of the oil cooler 45.

The opening portion 42b, which is disposed on the oil passage b3 at a location upstream of the merging point X, is formed as an orifice mechanism with an optimized opening area. The opening portion (orifice mechanism) 42b serves to appropriately distribute oil discharged from the electric oil pump 32 to the oil passage b1 and the oil passage b2 via the branch portion Y, that is, to appropriately set the amount of oil supplied from the electric oil pump 32 to the regulator valve 51 and the amount of oil supplied from the electric oil pump 32 to a lubrication circuit 46 via the oil passages b2 to b3, c4 to c5. That is, the opening portion 42b sets the amount of oil necessary for the lubrication circuit 46 while securing the amount of oil necessary for the hydraulic servo 61 to engage the clutch C-1. This prevents a phenomenon in which the amount of oil for the lubrication circuit 46 is increased excessively, for example, to result in an insufficient amount of oil to be supplied to the hydraulic servo 61 for the clutch C-1 during EV travel, which enables accurate control of the engagement state of the clutch C-1. Thus, preparations for engagement of the clutch C-1 can be made accurately even during EV travel, which enables a responsive transition from EV travel to travel which uses the internal combustion engine 2 or hybrid travel. In other words, the opening portion 42b suppresses an excessive increase in amount of oil for the lubrication circuit 46, for example, thereby preventing an increase in size of the electric oil pump 32. With the opening portion 42b of the check ball valve 42 formed as an orifice mechanism, the number of parts can be reduced and the oil passage structure can be simplified compared to a case where an orifice is provided separately from the check ball valve 42, which improves the manufacture efficiency.

Meanwhile, the hydraulic pressure discharged from the discharge port 51b of the regulator valve 51 is supplied to the oil cooler 45 via the oil passage c1. The oil cooler 45 is formed such that oil passes through a large number of thin pipes, for example, and the oil cooled through the oil cooler 45 is led to an oil passage c2.

The oil passage c2 is connected to an opening portion 43a of a first check ball valve (first reverse flow prevention mechanism) 43. The first check ball valve 43 includes a ball 43B and a spring 43s that urges the ball 43B in a direction of bringing the ball 43B into contact with a seal surface 43c. When the hydraulic pressure at an opening portion 43b and the urging force of the spring 43s are larger than the hydraulic pressure supplied to the opening portion 43a, the ball 43B tightly contacts the seal surface 43c to block communication between the opening portion 43a and the opening portion 43b. When the hydraulic pressure supplied to the opening portion 43a is larger than the hydraulic pressure at the opening portion 43b and the urging force of the spring 43s, the ball 43B is moved away from the seal surface 43c to establish communication between the opening portion 43a and the opening portion 43b.

The opening portion 43b of the first check ball valve 43 is connected via the oil passage c3 to the merging point X between the oil passage c3 and the oil passage b3, and further similarly connected via the oil passages c4, c5 to the lubrication circuit 46 that opens to the portions to be lubricated of the automatic speed change mechanism 5. That is, the check ball valve 43 is disposed between the oil cooler 45 and the merging point X that is between the oil passage c3 (second oil passage) and the oil passage b3 (third oil passage) to prevent reverse flow of a hydraulic pressure from the merging point X to the oil cooler 45.

In the hydraulic circuit of the automatic transmission 1 configured as described above, the oil passages a3 to a5, d1 to d2, f1 through which the line pressure $P_L$ regulated by the regulator valve 51 is supplied to a hydraulic servo (for example, 61) for engagement and disengagement of a friction engagement element such as the clutch C-1 may be defined as "first oil passage". The oil passages c1 to c5 through which a hydraulic pressure discharged from the regulator valve 51 is supplied to the lubrication circuit 46 via the oil cooler 45 may be defined as "second oil passage". The oil passages b2 to b3, c4 to c5 through which the hydraulic pressure produced by the electric oil pump 32 is supplied to the lubrication circuit 46 and which are merged with the second oil passage c1 to c5 may be defined as "third oil passage".

In the automatic transmission 1 configured as described above, the first check ball valve 43 is disposed between the oil cooler 45 and the merging point X that is between the oil passages c1 to c5 and the oil passages b2 to b3, c4 to c5 to prevent reverse flow of a hydraulic pressure from the merging point X to the oil cooler 45. Thus, when the hydraulic pressure produced by the electric oil pump 32 is supplied to the lubrication circuit 46 via the oil passages b2 to b3, c4 to c5 in the case where the vehicle is driven by the rear motor 20 with the internal combustion engine 2 stopped, only a small amount of oil that was unused in regulating the line pressure $P_L$ flows to the oil cooler 45 from the discharge port 51b of the regulator valve 51. That is, it is possible to prevent a large amount of oil from flowing into the oil cooler 45. This makes it possible to secure a stable hydraulic pressure to be supplied to the hydraulic servo 61 for the clutch C-1. This also eliminates the need to increase the size of the electric oil pump 32, thereby reducing the cost of the automatic transmission 1.

The first check ball valve 43, which is a so-called one-way valve, can be easily retrofitted between the oil cooler 45 and the merging point X compared to a case where the hydraulic control device 6 is modified to be provided with a check ball mechanism, for example. That is, there is no need to significantly change the design of the automatic transmission.

Further, the regulator valve 51 is configured such that the urging force of the spring 51s exceeds the feedback force produced in the feedback oil chamber 51c even in the case where the electric oil pump 32 produces a maximum hydraulic pressure when the oil temperature is low. Thus, in the case where the hydraulic pressure produced by the electric oil pump 32 is lowered when the oil temperature is low, for example, oil is prevented from flowing from the discharge port 51b of the regulator valve 51 to the oil cooler 45 to secure the amount of oil that flows to the lubrication circuit 46 via the oil passages b2 to b3, c4 to c5. That is, it is possible to prevent occurrence of insufficient lubrication even when the oil temperature is low.

The opening portion (orifice mechanism) 42b is provided on the oil passage b3 at a location upstream of the merging point X to set the amount of oil supplied from the electric oil pump 32 to the hydraulic servo 61 and the amount of oil supplied from the electric oil pump 32 to the lubrication circuit 46. This prevents a phenomenon in which the amount of oil that flows to the lubrication circuit 46 via the oil passages b2 to b3, c4 to c5 is increased excessively, for example, to result in an insufficient amount of oil to be supplied to the hydraulic servo 61 for the clutch C-1. Consequently, preparations for engagement of the clutch C-1 can be made accurately even during EV travel, which enables a responsive transition from EV travel to travel which uses the internal combustion engine 2 or hybrid travel.

The second check ball valve 41 is interposed between the mechanical oil pump 31 and the electric oil pump 32 to prevent reverse flow of a hydraulic pressure from the mechanical oil pump 31 to the electric oil pump 32, and the third check ball valve 42 is provided on the oil passages b2 to b3 at a location on the electric oil pump 32 side with respect to the merging point X to prevent reverse flow of a hydraulic pressure from the mechanical oil pump 31 to the electric oil pump 32. Thus, it is possible to prevent reverse flow of a hydraulic pressure to the electric oil pump 32 during travel with the mechanical oil pump 31 producing a hydraulic pressure. In particular, reverse flow of a hydraulic pressure from the oil cooler 45 to the electric oil pump 32 via the oil passages b3 to b2 is not caused, which prevents an insufficient amount of oil for the lubrication circuit 46.

In the embodiment described above, the automatic transmission 1 is applied to the rear-motor hybrid vehicle 100. However, the present invention is not limited thereto, and may be applied to any hybrid vehicle that incorporates an automatic transmission, that needs lubrication during EV travel, and for which preparations for engagement of a friction engagement element are made or engagement of a friction engagement element is completed during EV travel. As a matter of course, the hybrid vehicle includes a plug-in hybrid vehicle that can be charged for EV travel.

In the embodiment, the automatic transmission 1 is a multi-speed automatic transmission that establishes six forward speeds and a reverse speed. However, the present invention is not limited thereto, and may be applied to a multi-speed automatic transmission that establishes seven or more forward speeds or five or less forward speeds or that is a belt, toroidal, or ring-cone continuously variable transmission.

In the embodiment, the opening portion 42b formed as an orifice mechanism is provided to distribute oil discharged from the electric oil pump 32 to the oil passages b1, b2. However, the oil passage b2 may be structured to be thinner than the oil passage b1, for example, for the same purpose. That is, any means that can set the amount of oil to be distributed may alternatively be used.

In the embodiment, further, oil discharged from the electric oil pump 32 is distributed to the oil passages b1, b2 at the branch portion Y. However, a two-port oil pump (with two discharge ports) may also be used as the electric oil pump, for example.

In the embodiment, preparations for engagement of the clutch C-1 have been made or engagement of the clutch C-1 has been completed during EV travel. However, engagement of the clutch C-1 may be suspended, all of the clutches and the brakes may be completely disengaged, or preparations for engagement of the clutch C-2 may have been made or engagement of the clutch C-2 may have been completed as long as the vehicle is in a state in which the fifth forward speed or the sixth forward speed, for example, can be selected in accordance with the vehicle speed.

In the embodiment, the first to third check ball valves 41, 42, 43 are used as examples of the reverse flow prevention mechanisms. However, any configuration that can prevent reverse flow such as shuttle valves, check valves, ball mechanisms, and on-off valves, for example, may also be used. The first to third reverse flow prevention mechanisms preferably have a valve structure (one-way valve) that can be disposed independently so as to be retrofitted.

The hybrid vehicle automatic transmission according to the present invention can be used for vehicles such as passenger cars and trucks, and is particularly suitable for use in vehicles for which it is desired to reduce a cost by reducing the size of an electric oil pump and to secure a stable hydraulic pressure supplied by the electric oil pump during EV travel.

What is claimed is:

1. An automatic transmission for a hybrid vehicle disposed on a transfer path between an internal combustion engine and wheels and controlled so as to be able to run idle in the case where a vehicle is driven by a rotary electric machine with the internal combustion engine stopped, comprising:
   a first hydraulic pressure supply source driven in conjunction with the internal combustion engine to produce a hydraulic pressure;
   a second hydraulic pressure supply source driven by electric power independently of the first hydraulic pressure supply source to produce a hydraulic pressure;
   a regulator valve that regulates the hydraulic pressure produced by the first hydraulic pressure supply source and the second hydraulic pressure supply source to a line pressure;
   a first oil passage through which the line pressure regulated by the regulator valve is supplied to a hydraulic servo for engagement and disengagement of a friction engagement element;
   a second oil passage through which a hydraulic pressure discharged from the regulator valve is supplied to a portion to be lubricated via an oil cooler;
   a third oil passage through which the hydraulic pressure produced by the second hydraulic pressure supply source is supplied to the portion to be lubricated, the third oil passage being merged with the second oil passage at a location downstream of the oil cooler; and
   a first reverse flow prevention mechanism disposed between the oil cooler and a merging point that the second oil passage and the third oil passage are merged to prevent reverse flow of a hydraulic pressure from the merging point to the oil cooler.

2. The automatic transmission for the hybrid vehicle according to claim 1, wherein
   the first reverse flow prevention mechanism is a one-way valve.

3. The automatic transmission for the hybrid vehicle according to claim 1, wherein
   the regulator valve includes a spool, an urging member that urges the spool toward one side of the regulator valve, a pressure regulation port connected to respective discharge ports of the first hydraulic pressure supply source and the second hydraulic pressure supply source and connected to the first oil passage, a feedback oil chamber that is connected to the pressure regulation port and that presses the spool toward the other side of the regulator valve by using an input hydraulic pressure, and a discharge port that establishes communication between the pressure regulation port and the second oil passage when the spool is moved to the other side of the regulator valve, and the regulator valve is configured such that an urging force of the urging member exceeds a feedback force produced in the feedback oil chamber even in the case where the second hydraulic pressure supply source produces a maximum hydraulic pressure when an oil temperature is low.

4. The automatic transmission for the hybrid vehicle according to claim 2, wherein
the regulator valve includes a spool, an urging member that urges the spool toward one side of the regulator valve, a pressure regulation port connected to respective discharge ports of the first hydraulic pressure supply source and the second hydraulic pressure supply source and connected to the first oil passage, a feedback oil chamber that is connected to the pressure regulation port and that presses the spool toward the other side of the regulator valve by using an input hydraulic pressure, and a discharge port that establishes communication between the pressure regulation port and the second oil passage when the spool is moved to the other side of the regulator valve, and the regulator valve is configured such that an urging force of the urging member exceeds a feedback force produced in the feedback oil chamber even in the case where the second hydraulic pressure supply source produces a maximum hydraulic pressure when an oil temperature is low.

5. The automatic transmission for the hybrid vehicle according to claim 1, further comprising:
an orifice mechanism provided on the third oil passage at a location upstream of the merging point to set an amount of oil supplied from the second hydraulic pressure supply source to the hydraulic servo and an amount of oil supplied from the second hydraulic pressure supply source to the portion to be lubricated.

6. The automatic transmission for the hybrid vehicle according to claim 2, further comprising:
an orifice mechanism provided on the third oil passage at a location upstream of the merging point to set an amount of oil supplied from the second hydraulic pressure supply source to the hydraulic servo and an amount of oil supplied from the second hydraulic pressure supply source to the portion to be lubricated.

7. The automatic transmission for the hybrid vehicle according to claim 3, further comprising:
an orifice mechanism provided on the third oil passage at a location upstream of the merging point to set an amount of oil supplied from the second hydraulic pressure supply source to the hydraulic servo and an amount of oil supplied from the second hydraulic pressure supply source to the portion to be lubricated.

8. The automatic transmission for the hybrid vehicle according to claim 4, further comprising:
an orifice mechanism provided on the third oil passage at a location upstream of the merging point to set an amount of oil supplied from the second hydraulic pressure supply source to the hydraulic servo and an amount of oil supplied from the second hydraulic pressure supply source to the portion to be lubricated.

9. The automatic transmission for the hybrid vehicle according to claim 1, further comprising:
a second reverse flow prevention mechanism interposed between the first hydraulic pressure supply source and the second hydraulic pressure supply source to prevent reverse flow of a hydraulic pressure from the first hydraulic pressure supply source to the second hydraulic pressure supply source; and
a third reverse flow prevention mechanism provided on the third oil passage at a location on a second hydraulic pressure supply source side with respect to the merging point to prevent reverse flow of a hydraulic pressure from the first hydraulic pressure supply source to the second hydraulic pressure supply source.

10. The automatic transmission for the hybrid vehicle according to claim 2, further comprising:
a second reverse flow prevention mechanism interposed between the first hydraulic pressure supply source and the second hydraulic pressure supply source to prevent reverse flow of a hydraulic pressure from the first hydraulic pressure supply source to the second hydraulic pressure supply source; and
a third reverse flow prevention mechanism provided on the third oil passage at a location on a second hydraulic pressure supply source side with respect to the merging point to prevent reverse flow of a hydraulic pressure from the first hydraulic pressure supply source to the second hydraulic pressure supply source.

11. The automatic transmission for the hybrid vehicle according to claim 3, further comprising:
a second reverse flow prevention mechanism interposed between the first hydraulic pressure supply source and the second hydraulic pressure supply source to prevent reverse flow of a hydraulic pressure from the first hydraulic pressure supply source to the second hydraulic pressure supply source; and
a third reverse flow prevention mechanism provided on the third oil passage at a location on a second hydraulic pressure supply source side with respect to the merging point to prevent reverse flow of a hydraulic pressure from the first hydraulic pressure supply source to the second hydraulic pressure supply source.

12. The automatic transmission for the hybrid vehicle according to claim 4, further comprising:
a second reverse flow prevention mechanism interposed between the first hydraulic pressure supply source and the second hydraulic pressure supply source to prevent reverse flow of a hydraulic pressure from the first hydraulic pressure supply source to the second hydraulic pressure supply source; and
a third reverse flow prevention mechanism provided on the third oil passage at a location on a second hydraulic pressure supply source side with respect to the merging point to prevent reverse flow of a hydraulic pressure from the first hydraulic pressure supply source to the second hydraulic pressure supply source.

13. The automatic transmission for the hybrid vehicle according to claim 5, further comprising:
a second reverse flow prevention mechanism interposed between the first hydraulic pressure supply source and the second hydraulic pressure supply source to prevent reverse flow of a hydraulic pressure from the first hydraulic pressure supply source to the second hydraulic pressure supply source; and
a third reverse flow prevention mechanism provided on the third oil passage at a location on a second hydraulic pressure supply source side with respect to the merging point to prevent reverse flow of a hydraulic pressure from the first hydraulic pressure supply source to the second hydraulic pressure supply source.

14. The automatic transmission for the hybrid vehicle according to claim 6, further comprising:
a second reverse flow prevention mechanism interposed between the first hydraulic pressure supply source and the second hydraulic pressure supply source to prevent reverse flow of a hydraulic pressure from the first hydraulic pressure supply source to the second hydraulic pressure supply source; and a third reverse flow prevention mechanism provided on the third oil passage at a location on a second hydraulic pressure supply source side with respect to the merging point to prevent reverse flow of a hydraulic pressure from the first hydraulic pressure supply source to the second hydraulic pressure supply source.

15. The automatic transmission for the hybrid vehicle according to claim 7, further comprising:
a second reverse flow prevention mechanism interposed between the first hydraulic pressure supply source and the second hydraulic pressure supply source to prevent reverse flow of a hydraulic pressure from the first hydraulic pressure supply source to the second hydraulic pressure supply source; and
a third reverse flow prevention mechanism provided on the third oil passage at a location on a second hydraulic pressure supply source side with respect to the merging point to prevent reverse flow of a hydraulic pressure from the first hydraulic pressure supply source to the second hydraulic pressure supply source.

16. The automatic transmission for the hybrid vehicle according to claim 8, further comprising:
a second reverse flow prevention mechanism interposed between the first hydraulic pressure supply source and the second hydraulic pressure supply source to prevent reverse flow of a hydraulic pressure from the first hydraulic pressure supply source to the second hydraulic pressure supply source; and
a third reverse flow prevention mechanism provided on the third oil passage at a location on a second hydraulic pressure supply source side with respect to the merging point to prevent reverse flow of a hydraulic pressure from the first hydraulic pressure supply source to the second hydraulic pressure supply source.

* * * * *